United States Patent [19]
Martin et al.

[11] 3,975,609
[45] Aug. 17, 1976

[54] VACUUM DELAY VALVE

[75] Inventors: Frank J. Martin; Rex R. Holbrook, both of Ann Arbor, Mich.

[73] Assignee: Chrysler Corporation, Highland Park, Mich.

[22] Filed: May 10, 1974

[21] Appl. No.: 468,851

Related U.S. Application Data

[62] Division of Ser. No. 311,090, Dec. 1, 1972, Pat. No. 3,857,373.

[52] U.S. Cl. .......................... 219/69 M; 29/157.1 R
[51] Int. Cl.² .......................................... B73K 9/16
[58] Field of Search .............. 219/121 EB, 121 EM, 219/69 R, 69 M; 29/157.1, DIG. 7; 310/8.1

[56] References Cited
UNITED STATES PATENTS

| | | | |
|---|---|---|---|
| 2,588,744 | 3/1952 | McKechnie | 219/69 R |
| 2,608,352 | 8/1952 | Schuster et al. | 29/157.1 R |
| 2,793,281 | 5/1957 | Steigerwald | 219/121 EB X |
| 3,318,578 | 5/1967 | Branson | 310/8.1 X |

Primary Examiner—J. V. Truhe
Assistant Examiner—G. R. Peterson
Attorney, Agent, or Firm—Talburtt & Baldwin

[57] ABSTRACT

A method of manufacturing an orifice delay valve having an apertured plate which is formed by coining a section in the plate, eroding a portion of the coined section by electrical discharge machining followed by ultra-sonic cleaning of the plate.

3 Claims, 9 Drawing Figures

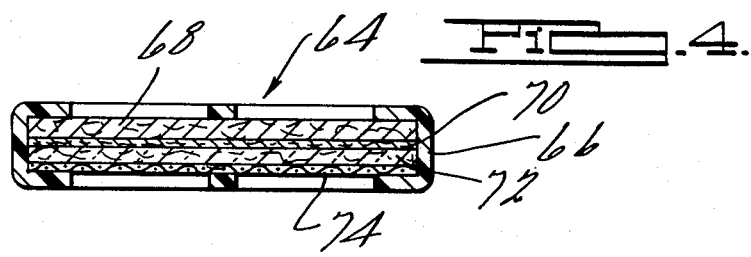
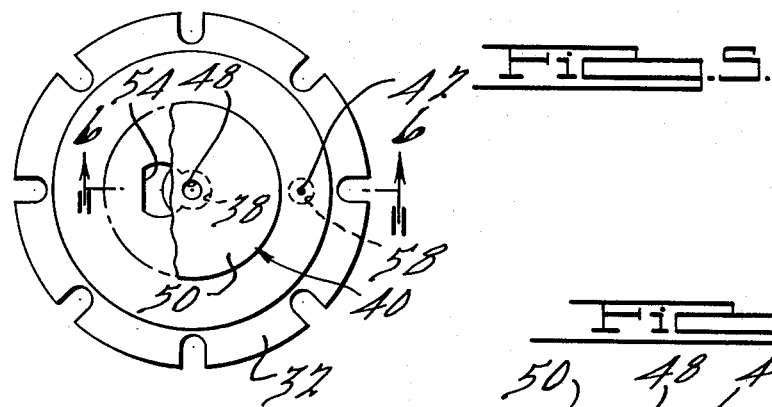
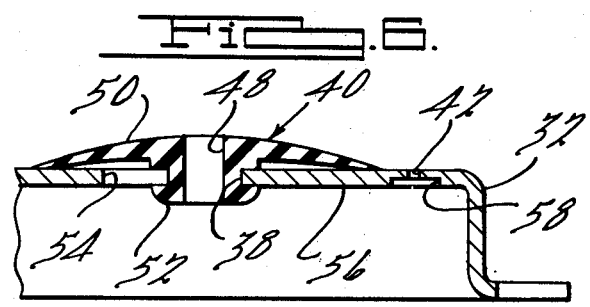
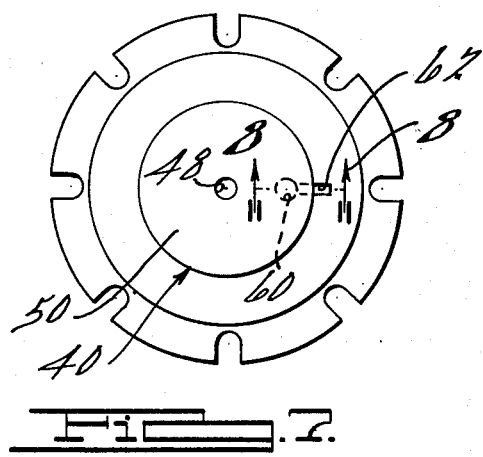
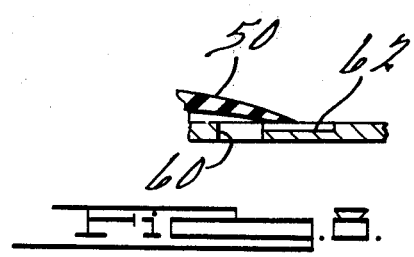

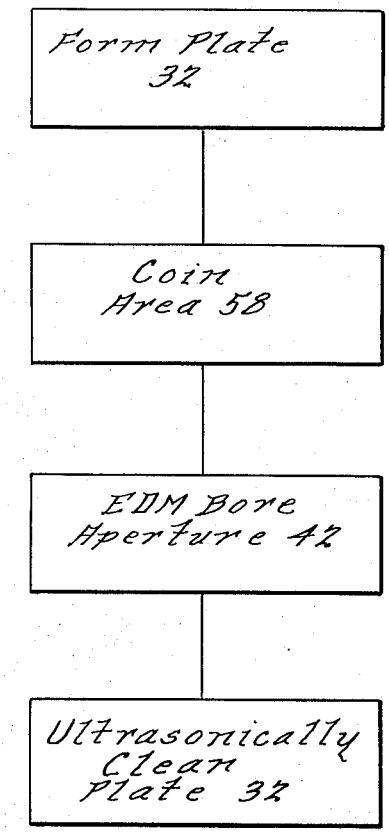

VACUUM DELAY VALVE

BACKGROUND OF INVENTION

1. Cross Reference to Related Applications

The present application is a divisional application of U.S. Ser. No. 311,090 filed Dec. 1, 1972, now U.S. Pat. No. 3,857,373.

FIELD OF INVENTION

This invention relates to vacuum valves in general and, particularly to time delay metering valves as used for controlling exhaust gas emissions from an internal combustion engine.

PRIOR ART

Various systems have been and are used for controlling the engine vacuum spark advance control motor for reducing exhaust emissions. One such system, identified as a transmission spark advance control system, utilizes a fluid pressure responsive switch for electrically disabling the spark advance control below a certain vehicle speed if the vehicle is equipped with an automatic transmission. If the vehicle is equipped with a manual transmission, the vacuum advance is disabled when the transmission is in first or second gear. An example of such a switch is found in U.S. Pat. No. 3,600,535.

Another system is identified as an automatic vacuum spark advance control system and is an electric controlled vacuum and speed responsive system for disabling the engine vacuum advance during acceleration below certain speeds and within a predetermined vacuum range. An example of a controller as used in such a system is found in U.S. Pat. No. 3,655,904.

SUMMARY OF INVENTION

It is, therefore, a principal object of this invention to control the vacuum build up at the output of a valve when the input vacuum is increased.

It is another object of this invention to reduce the vacuum at the output of a valve when the input vacuum is reduced.

It is still another object of this invention to filter out the smallest particles in the vacuum fluid without restricting the fluid flow through the valve.

It is yet another object of this invention to control the operation of the valve in response to the temperature environment of the valve.

These and other objects of the invention will become apparent in the following drawings, detailed description and claims of a vacuum delay valve having a housing containing a chamber therein with an input and output port for fluid communication with the chamber. a plate is supported within the chamber between the input and output ports for dividing the chamber into two vacuum-tight chambers. Located through the plate and in fluid communication with both chambers is a unidirectional valve for allowing the vacuum at the output port to be reduced synchronously with the vacuum at the input port. Positioned adjacent to the unidirectional valve on the plate and in fluid communication between both chamber is a time-metering delay orifice for controlling the rate of change of the vacuum at the output port when the vacuum at the input port is increased. In addition, a thermal responsive actuator cooperates with the unidirectional valve to change the valve characteristics to a bidirectional full flow valve below a predetermined temperature range.

DESCRIPTION OF THE DRAWINGS

In the drawings:

FIG. 4 is an enlarged sectional view of the filter shown in FIG. 3;

FIG. 5 is a plan view of the unidirectional valve and plate as utilized in the valve of FIG. 2;

FIG. 6 is a sectional view taken along line 6—6 in FIG. 5 illustrating the orifice time metering valve of the valve in FIG. 2;

FIG. 7 is a plan view of another embodiment of the time metering orifice of the valve;

FIG. 8 is a sectional view taken along line 8—8 of FIG. 7; and

FIG. 9 is a functional diagram representing the sequence of steps in the method of fabricating the orifice in the delay valve.

DETAILED DESCRIPTION

Figure 1:
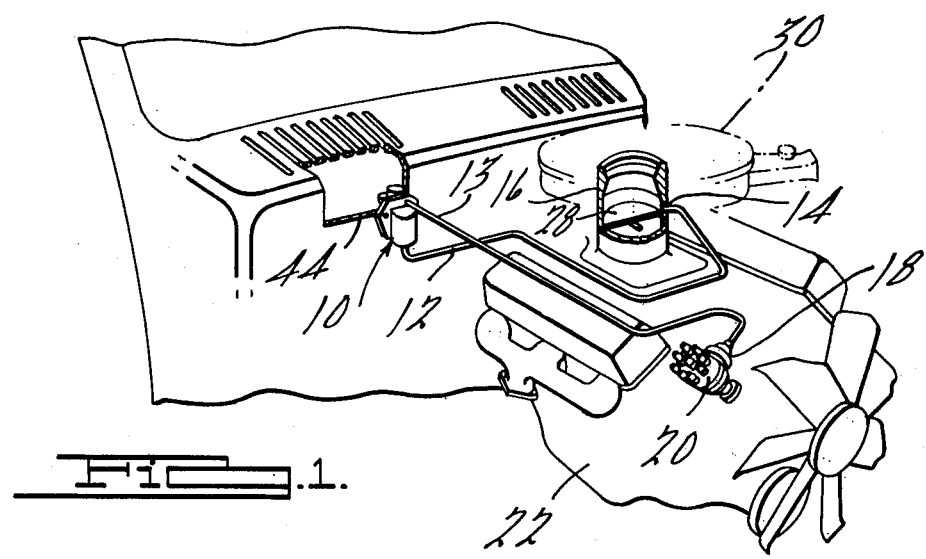
FIG. 1 is a schematic of the engine vacuum spark advance control system utilizing the vacuum valve.

Referring to the figures by the characters of reference, there is illustrated in FIG. 1 a schematic of an internal combustion engine spark advance control system utilizing a vacuum delay valve. The vacuum delay valve 10 is interconnected in the vacuum line 12 and 13 between the ported vacuum port 14 of the carburetor 16 and vacuum motor 18 in the spark advance mechanism of the distributor 20. The vacuum valve 10 controls the application of vacuum to the vacuum motor 18 for advancing or retarding the ignition of the engine 22.

The vacuum valve 10 comprises a housing 24 having an enclosed chamber with at least two ports 26 and 27 with an integral nipple extension for fluid communication therewith. One of the ports 26 is connected by a first vacuum line 12 to the carburetor 16 and another port 27 is connected by a second vacuum line 13 to the vacuum motor 18 in the spark advance control unit.

In the carburetor 16, schematically illustrated in FIG. 1, the throttle plate 28 is in the illustrated position when the internal combustion engine 22 is at idle. The value of the ported vacuum at this time is approximately equal to the atmospheric pressure of the air being drawn into the carburetor 16 from the air cleaner 30. As the throttle is opened, the throttle plate 28 moves in a counter-clockwise position, the ported vacuum approaches the value of the manifold vacuum. In systems without the vacuum valve 10, ported vacuum is supplied directly to the spark advance control vacuum motor 18 for controlling the ignition point of the engine 22. During transient vehicle operation, the spark is advanced and, as a result, the emission gases are rich in oxides of nitrogen. It is a function of the vacuum delay valve 10 to delay the vacuum build-up applied to the spark advance control vacuum motor during transient engine operation thereby effectively retarding the spark.

As previously stated, the vacuum valve 10 comprises a housing 24 containing an enclosed chamber with at least two spaced-apart ports 26 and 27, namely, an input 26 and output 27 port. Supported within the chamber is a plate means 32 for dividing the chamber into a first 34 and a second 36 pressure chamber wherein each of said chambers has a port connected thereto.

In the preferred embodiment, the plate 32 has an aperture 38 therein for receiving a unidirectional or dump valve 40 for controlling the fluid communication between the two chambers 34 and 36. When the pressure in the first chamber 34 is greater than the pressure in the second chamber 36, the dump valve 40 permits unrestricted fluid communication between the chambers. However, when the pressure is less or the vacuum greater in the first chamber, the dump valve blocks fluid communication between the two chambers.

Located in the plate 32 and out of the confines of the dump valve 40 is a delay orifice 42 for controlling the rate of fluid communication between the chambers when the vacuum is greater in the first chamber 34, Therefore, the dump valve 40 allows unrestricted fluid communication between the chambers when the pressure is greater in the first chamber and the delay orifice 42 controls the fluid communication between the chambers when the vacuum is greater in the first chamber 34.

In the preferred embodiment and as illustrated in FIG. 1, the vacuum valve is physically positioned on either side of the engine compartment fire wall 44 with a portion of the valve protruding into the cowl inlet area. Located in the portion of valve in the cowl area is a thermal actuating member 46 or bimetal which cooperates with an aperture 48 in the dump valve making te operation of the dump valve responsive to the temperature of the valve environment.

Figures 2, 3:
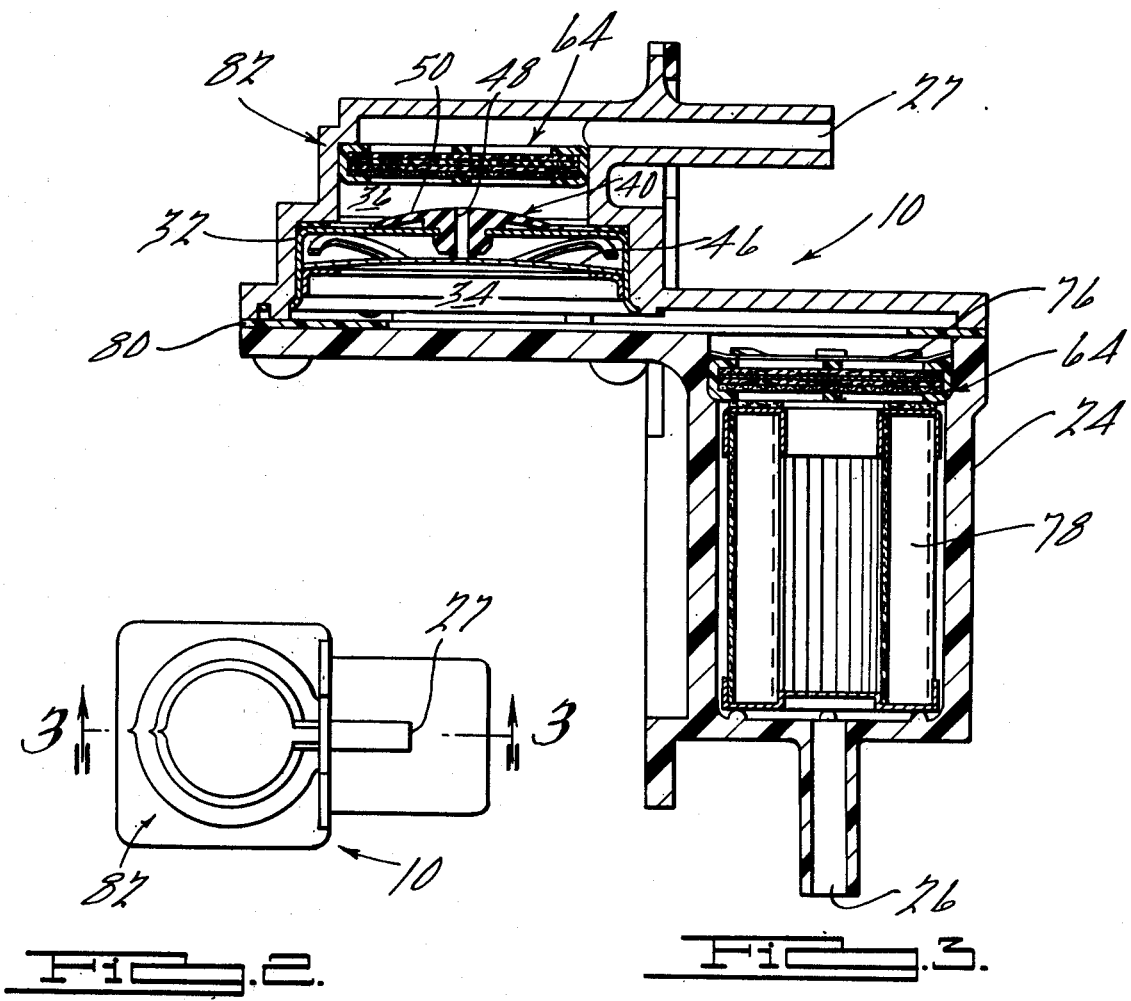
FIG. 2 is a plan view of the vacuum valve.
FIG. 3 is a sectional view of the vacuum valve taken along line 3—3 in FIG. 2.

As illustrated in FIG. 3, the dump valve 40 is an umbrella-shaped valve having the axially located aperture 48 extending through both the umbrella portion 50 and stem portion 52 of the valve. The stem portion 52 is located in the aperture 38 in the plate 32 between the chambers 34 and 36 thereby locating and holding te valve in position. The aperture 48 provides bidirectional fluid communication between the chambers.

When the temperature of the environment surrounding the valve is above a first predetermined temperature which is 68°F., the bimetal member 46 is in its first position in contact with the stem portion 52 of the dump valve thereby sealing the aperture 48 against fluid communication therethrough. When the temperature goes below a second predetermined temperature of 48°F., the bimetal member 46 snaps over to its second position away from the dump valve thereby opening the aperture 48.

The aperture 38 in the plate 32 in the preferred embodiment as illustrated in FIG. 5, comprises an elongated slot having a portion 54 at one end with a diameter which is greater than the diameter of the stem portion 52 of the dump valve. The other end of the slot is of a diameter adapted to receive one of the smaller diameters of the stem 52. The particular configuration of the slot as illustrated in FIG. 5 permits easy insertion of the valve 40 into the plate 32 at the one end and also provides a path for fluid communication between the chambers when the pressure is greater in the first chamber. Thus, if the temperature is greater than 68°F., the dump valve function as a unidirectional valve inasmuch as the axially located aperture 48 is closed by the thermal actuated member 46. Below 48°F., the dump valve is a bi-directional valve with fluid communication in both directions through the aperture 48 in the valve.

The delay valve in a preferred embodiment is a small orifice 42 extending through the plate 32 and located outside of the confines of the umbrella portion 50 of the dump valve 40. The orifice 42 has a predetermined diameter and length for controlling the rate of fluid communication between the chambers 34 and 36 when the temperature is greater than 68°F. and the dump valve aperture 48 is sealed.

In the preferred embodiment as illustrated in FIG. 6, the side 56 of the plate 32 facing the first chamber 34 has a coined or thinned area 58 for reducing the thickness of the plate 32. The orifice 42 is located within this area thereby reducing the length of the orifice and reducing the manufacturing time to put the orifice in the plate.

In the preferred embodiment, the orifice 42 is 0.005 inch long and the diameter is 0.003 inch resulting in a time delay of 28 seconds for increasing the vacuum in the second chamber 36 from 0 inches to 9.5 inches of mercury when the vacuum in the first chamber 34 is equal to 12 inches of mercury.

FIGS. 7 and 8 illustrate a modification of the delay valve comprising a second aperture 60 in the plate located under the umbrella portion 50 of the valve and a small coined slot 62 extending from the second aperture to outside the umbrella perimeter. The volume of the slot 62 enclosed by the edge of the umbrella determines the time delay. The second aperture 60 can also function as the check valve allowing communication when the vacuum is greater in the second chamber.

Positioned on either side of the orifice 42 in both chambers is a filter 64 for filtering out foreign particles in the fluid passing through the valve. Each of the filters 64 is a laminated filter comprising of four layers which are enclosed in a housing 66 forming a unitary structure. The first filter member 68 which is positioned furthest from the orifice, is a random orientated felt material providing a depth filter for trapping relatively large foreign particles in the fluid flow and also for dispersing the fluid flow through the filter. The second filter member 70 which is positioned in contact with the first filter member 68 is a paper filter for removing from the fluid passing through the first filter member, particles having a size greater than 15 microns. The third filter member 72 positioned in contact with the second filter member is fiberglas filter for removing from the fluid passing through the second filter member, particles having a size greater than 0.3 microns.

The last layer 74 of the filter 64 is a nylon screen for protecting the fiberglas filter 72 when the nylon housing 66 is moulded around the laminated members forming a unitary structure. Thus, it is seen that the fluid leaving the filter 64 will be dispersed fluid free from particles greater than 0.3 microns in size. The filter 64 is pressed into the valve housing 24 such that all fluid flow must go through the filters 64 and cannot go around the filter housing. A spring clip 76 may be used for holding the filter in the housing.

In addition to the above two laminated filters 64, there is an additional filter 78 in the first chamber. This filter is for removing from the fluid any liquids such as gasoline or water which may be in the vacuum line 12 coming from the carburetor and which, if not removed, would tend to clog and block the filter 64.

The method of fabricating critical control orifice in the delay valve is indicated in FIG. 9 and comprises the use of an electric discharge erosion machine. The actual apparatus employed for boring the orifice 42 in the plate 32 was a Model 5H201 EDM machine manufactured by the Raycon Corporation of Ann Arbor, Mich. The plate 32 is first formed to size and shaped as illustrated in FIG. 5 to conform to the configuration of the valve chambers and having the slotted aperture 38 formed therein. Next, a small area 58 near the periphery of the plate is coined to a reduced predetermined thickness. The plate member 32 is then positioned within the aforementioned electrical discharge machine in such a manner that the electrical discharge from the erosion electrode of the machine will pass through the coined area 58. As previously indicated in the preferred embodiment, the orifice 42 is .003 inch in diameter and 0.005 inch in length.

After all the individual parts of the delay valve 10 are fabricated, they are ultrasonically cleaned to remove all foreign particles. The actual apparatus employed was a model TO 272930 ultrasonic cleaner machine manufactured by the Crest Ultrasonics, Inc.. After cleaning the valve is then assembled in a "Clean Room" area. This method of assembly assures that when the valve 10 is assembled, there are no dirt particles within the valve which will render the valve inoperative. As previously mentioned, the laminated filters 64 function to clean the fluid flow through the valve after the valve is assembled. The filters are such as to reject particles as small as 1/200 the diameter of the human hair from reaching the orifice 42.

As illustrated in the drawings, a major portion of the first chamber 32 is offset from the second chamber 36 and, in order to provide fluid communications between the two chambers, a rubber gasket 80 cooperating with an upper housing member 82 forms a passageway between both sections of the first chamber 34.

As indicated above, the function of the vacuum valve is to delay the vacuum build-up to the distributor vacuum 18 motor. This delay occurs when the vacuum in the carburetor 16 is greater than the vacuum in the distributor vacuum motor 18. This delay functions to retard the engine spark thereby delaying the burning process in the cylinders. When the burning process is delayed the exhaust gas temperatures are increased and peak cylinder pressures are reduced thereby reducing te amount of unburned hydrocarbons and oxides of nitrogen in the exhaust gas from the engine 22. However, due to the structure of the valve 10 when the temperature is low below 48°F., there is no delay through the valve in either direction.

There has thus been shown and described a vacuum delay valve 10 such as may be used in a motor vehicle. At predetermined temperatures, the valve operates to delay the build-up of vacuum from the carburetor to the vehicle spark advance control unit. However, when the vacuum is greater at the control unit, the valve functions to provide non-restrictive fluid flow to reduce that vacuum.

What is claimed is:

1. A method of fabricating an orifice time delay valve member which divides a valve chamber into two chambers wherein the rate of fluid communication between the chambers is controlled by the diameter and length of the orifice in the time delay valve, the method comprising the steps of:

forming a plate member of a predetermined thickness for structural rigidity and of a shape to conform to the configuration of the valve chambers, coining an area of said plate member to a thickness which is less than said predetermined thickness and corresponds to the desired length of the control orifice in the orifice time delay valve, and thereafter boring said coined area to provide an orifice therein of a predetermined size.

2. In the method according to claim 1, wherein the step of boring is accomplished by electrical discharge erosion in the coined area of the plate member.

3. In method according to claim 2 wherein the step of electrical discharge erosion to form the control orifice in the coined area of the plate member is followed by ultrasonic cleaning of the plate member.

* * * * *